United States Patent [19]

Muth et al.

[11] Patent Number: 4,826,212

[45] Date of Patent: May 2, 1989

[54] SHEET FOLDING METHOD AND APPARATUS

[75] Inventors: Stephan R. W. Muth, New York; Guenter Vollath, Tarrytown, both of N.Y.

[73] Assignee: VanDam Inc., New York, N.Y.

[21] Appl. No.: 95,175

[22] Filed: Sep. 10, 1987

[51] Int. Cl.[4] .......................... B42D 19/00; G09B 29/00; B31F 1/00

[52] U.S. Cl. .......................................... 283/34; 281/2; 493/162

[58] Field of Search .................. 281/1, 2, 5; 283/1 R, 283/34, 35, 36, 49; 493/162

[56] References Cited

U.S. PATENT DOCUMENTS 2,525,937 10/1950 Palm ........................................ 251/1

3,753,558 8/1973 Sheroff et al. ...................... 493/162

4,502,711 3/1985 Muth ........................................ 281/5

*Primary Examiner*—Paul A. Bell

*Attorney, Agent, or Firm*—Leighton K. Chong

[57] ABSTRACT

An improved sheet folding method comprises forming an upper folding template and a lower folding template having plate elements corresponding to predetermined fold configurations desired to be formed, the plate elements being interconnected along respective joining lines between adjacent plates by thin, flexible joining parts which allow the plate elements to be folded together along the joining lines, placing a sheet to be folded between the upper and lower folding templates, then folding the stacked sheet and templates together according to the order of the fold configurations desired, whereby the desired fold lines are formed in the sheet corresponding to the joining lines betwen the plate elements in the order of the fold configurations.

10 Claims, 3 Drawing Sheets

SHEET FOLDING METHOD AND APPARATUS

FIELD OF THE INVENTION

The present invention relates to an improved method and apparatus for folding a sheet, such as paper or cardboard, and in particular, for folding a sheet with a plurality of folds which interleave with one another to a compact folded condition.

BACKGROUND OF THE INVENTION

A sheet folding method and resulting product, as shown in U.S. Pat. No. 4,502,711 of Stephan R. W. Muth, forms a plurality of folds which interleave so that the resulting folded sheet can fold to a compact size several times smaller than the planar dimensions of the sheet. Once the fold lines have been scored, the folded sheet is capable of being readily or even automatically self-folding and unfolding for the convenience of the user. This is particularly advantageous for making folded maps and other information guides in compact form which fits in a wallet, pocket or purse.

However, the interleaved folds must be formed with a high degree of accuracy and consistency, in order to ensure that the sheet folds back inwardly with the proper fit and without interference between the folds. Such folds are conventionally formed by hand separately, which requires a high amount of manual training and labor costs, or by a machine, such as shown in U.S. Pat. No. 3,753,558, which are very complex, have many moving parts, and require a high degree of machining and assembly time. Moreover, once such a folding machine is assembled to accomodate a particular sheet size, thickness, or fold configuration, it is very difficult and costly to change or adjust it to different sheet dimensions or folds.

SUMMARY OF THE INVENTION

The invention seeks to overcome the disadvantages of the conventional methods of folding an interleaved, folded sheet manually or by a complex folding machine. A principal object of the invention is to provide a folding method and apparatus which is simple to construct and perform, and which can be readily altered or adjusted for different sheet sizes and thickness or for different fold configurations.

In accordance with the invention, an improved sheet folding method comprises forming an upper folding template and a lower folding template having plate elements corresponding to predetermined fold configurations desired to be formed, the plate elements being interconnected along respective joining lines between adjacent plates by thin, flexible joining parts which allow the plate elements to be folded together along the joining lines, placing a sheet to be folded between the upper and lower folding templates, then folding the stacked sheet and templates together according to the order of the fold configurations desired, whereby the desired fold lines are formed in the sheet corresponding to the joining lines between the plate elements in the order of the fold configurations.

In the preferred embodiment of the invention, the plates elements are fabricated from a thin sheet of metal by photolithography using a master template, then the plate elements are assembled into upper and lower folding templates by applying joining parts to the elements held on an assembly frame. The joining parts may be plastic and/or metal foil adhesive tape which is thin yet has a high tensile strength to withstand repeated foldings.

Once the upper and lower templates are formed, the sheet is placed in between, then the stacked assembly is folded along the joining lines of the templates in the order of the desired fold configurations. The fold lines are formed by creasing at the joining lines of the upper and lower templates. The templates and joining parts must be sufficiently thin to allow the stacked assembly to be folded tightly enough to produce the desired fold lines. A particular fold configuration is disclosed which facilitates folding of the stacked assembly. The stacked assembly can be readily folded by hand, since the joining lines are already mechanically established, or by a machine of a relatively simple construction.

BRIEF DESCRIPTION OF THE DRAWINGS

The above objects, features, and advantages of the invention are described in detail below, in conjunction with the drawings, of which.

DETAILED DESCRIPTION OF THE INVENTION

Figure 1:
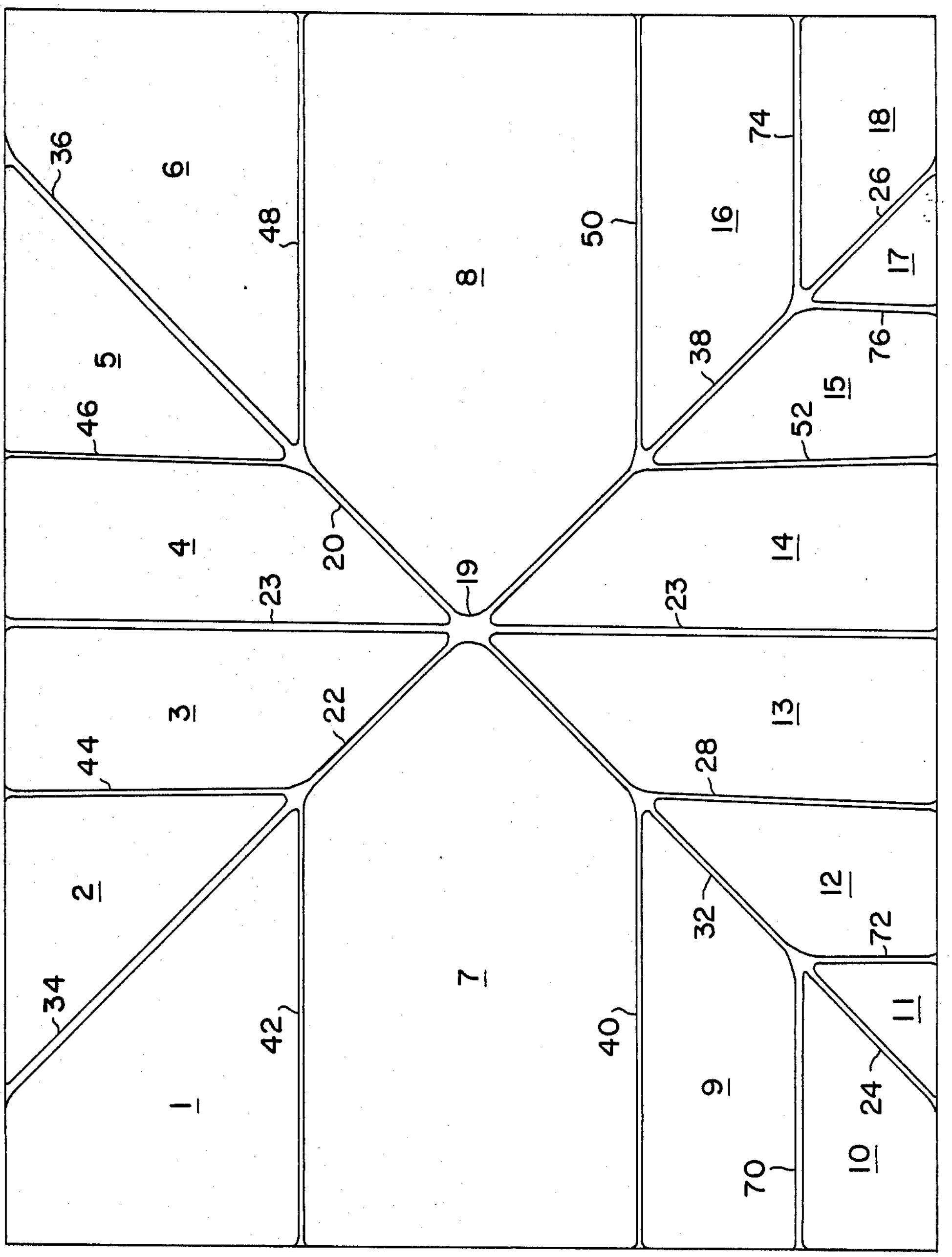
FIG. 1 is a plan view of a folding template formed in accordance with the principles of the invention.

Referring to FIG. 1, a template A is shown having plate elements 1–18 designed thereon according to a given set of folded pleats desired to be produced on a sheet. The plate elements 1–18 have joining lines between adjacent pairs of elements which form the corresponding fold lines on the sheet. Since they correspond identically, the same reference numerals used to refer to the joining lines and the plate elements of the templates are also used to designate the resulting fold lines and pleat elements formed in the sheet. The template lines shown in FIG. 1 are center 19, cross fold (joining) lines 20,22, central vertical fold lines 23, a pair of opposing side vertical fold lines 28,44 and 46,52, upper and lower lateral fold lines 42,48 and 40,50, outer cross fold lines 32,34 and 36,38, tuck vertical fold lines 72,76, tuck lateral fold lines 70,74, and tuck cross fold lines 24,26.

The plate elements 1–18 and joining lines are designed on a master template having precisely measured dimensions and line thicknesses which will allow the resultingly fabricated template to fold and to crease the sheet effectively so as to form the desired fold lines. The master template is used as a mask to form the plate elements by photolithography or other plate etching methods. Generally, a resist material is applied to the plate elements, and the joining lines are exposed to an etching agent. The sheet may be stainless steel, or aluminum or magnetic sheet metal having a preferred thickness of about 0.003 to 0.030 inch.

Figure 2:
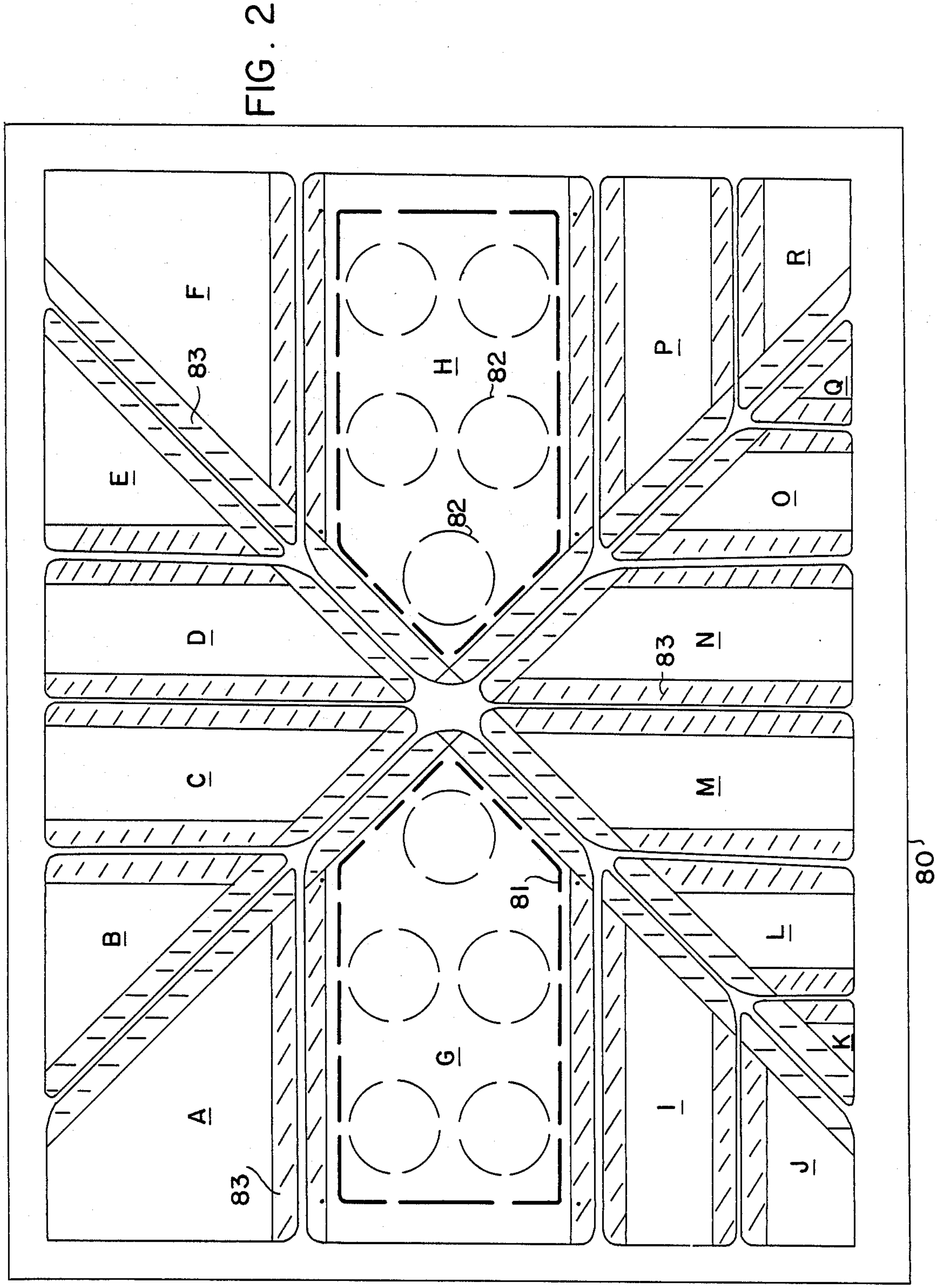
FIG. 2 is a plan view of the template of FIG. 1 assembled on an assembly frame.

Referring to FIG. 2, a second template B, similar to template A, is shown with its plate elements assembled on assembly frame 80. The assembly frame is formed as the inverse of the template B having recesses A-R, corresponding to plate elements 1–18, separated by raised lines corresponding to the fold (joining) lines shown in FIG. 1. The raised lines can be formed by etching recesses A-R using the master template as a mask. The frame is provided with a lower substrate 81, made of plastic, and the plate elements 1–18 are assembled on the substrate 81 using the raised lines as boundaries. Holes may be formed in the substrate to allow mounting of magnets 82 to securely hold the plate elements onto the frame 80, if the plate elements are formed from a magnetic material.

Once the plate elements are located in place on the frame 80, joining tape 83 is applied over the joining lines to hold the plate elements in their positions and to constitute the joining parts which will allow the plate elements to be folded interleavingly inward. The plate elements joined by the joining tape constitutes a folding template in accordance with the invention. Upper and lower templates A and B are formed, as described above, similar to each other. Alternatively, the lower template can have joining lines which are slightly wider than those of the upper template, since it will be folded on the outside and must accomodate the thickness of the folded upper template on the inside. The adhesive tape or adhered fabric is preferably applied to both sides on each template, for greater strength, by removing the template assembled in the frame 80, and applying tape to the other side of the plate elements now fixed in position.

The joining tape is preferably a reinforced plastic and/or metal foil adhesive tape which is flexible yet has a high tensile strength to withstand repeated foldings during long production runs. Alternatively, a high strength adhesive can be applied to the plates, then strips of a synthetic, high strength fabric, such as Teflon or Kevlar fabric, can be adhered thereon. Since the templates are made of a thin sheet of metal with thin joining tape, they can be readily folded tightly to form the desired creases in the sheet. A particular fold configuration is described below which allows tight folding of the templates.

Figure 3:
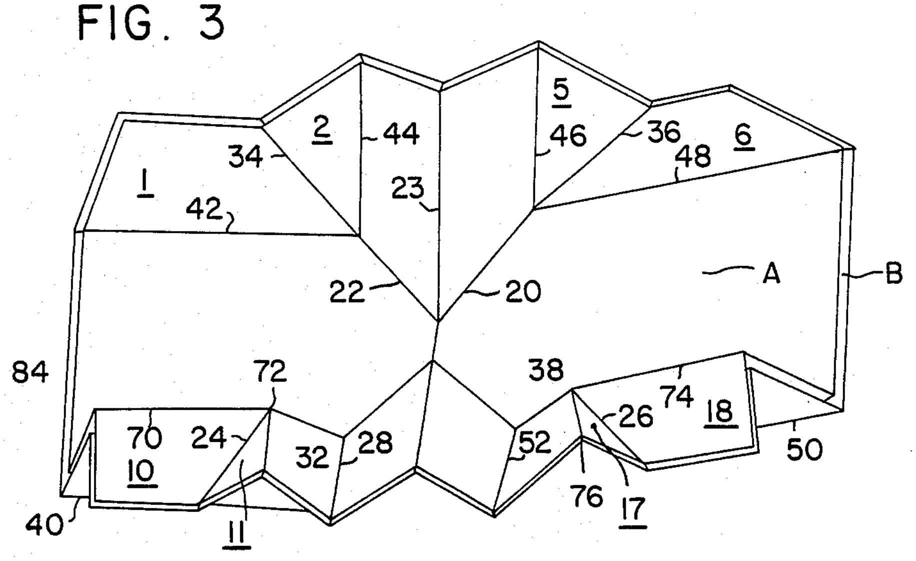
FIG. 3 is a perspective view of a sheet being folded between the lower folding templates.

Referring to FIG. 3, the method of the invention provides for folding a sheet 84 by stacking it in registration in between the upper and lower templates A and B, then folding the plate elements of the templates inward in the desired fold configurations. As shown in the drawing, a preferred folding configuration employs inverse folds to cross fold lines 20,22, a V-fold to central vertical fold line 23, V-folds to the pair of opposing side vertical fold lines 28,44 and 46,52, V-folds to upper and lower lateral fold lines 42,48 and 40,50, inverse folds to outer cross fold lines 32,34 and 36,38, inverse folds to tuck vertical fold lines 72,76 and tuck lateral fold lines 70,74, and V-folds to tuck cross fold lines 24,26. By this configuration, the inverse folds of the outer cross fold lines 32,34 for the upper plates 1,2 and 5,6 fold in interleaved fashion into the tuck folds 10,11 and 17,18 at an outer part of the folded templates, thereby removing any interference between the folded plates and allowing the templates to be folded tightly.

Figure 4:
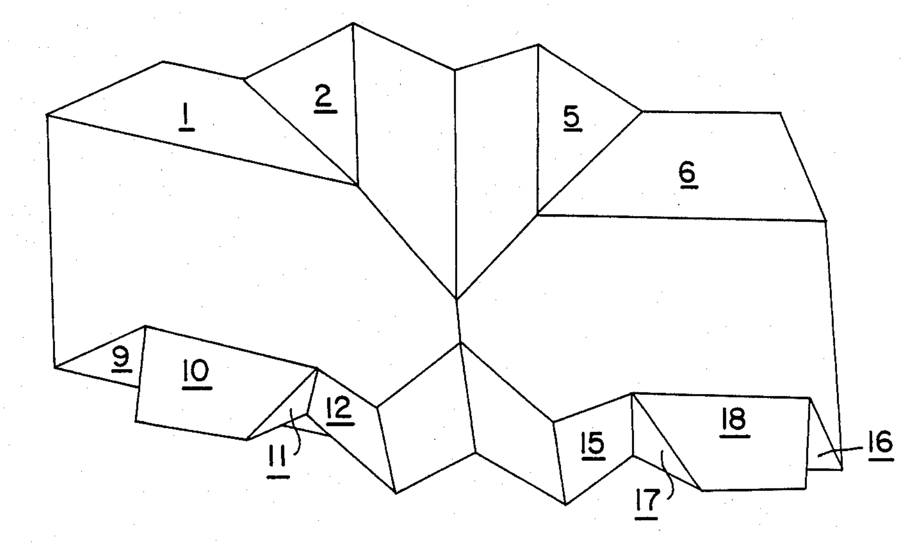
FIG. 4 is a perspective view of the resulting folded sheet product formed in accordance with the invention.

Referring to FIG. 4, the above-mentioned configuration of folding the upper and lower templates produces a sheet having the corresponding folds. The particular described configuration allows the inverse folds of outer pleats 1,2 and 5,6 to tuck inwardly into the V-folds of tuck pleats 10,11 and 17,18, respectively, in interleaved fashion, thereby allowing the sheet to fold to a more compact condition than if the outer pleats 1,2 and 5,6 on the upper side are spaced wider to avoid interference with outer pleats 9,12 and 15,16 on the lower side. The fold lines in the sheet fold readily or even automatically inward in interleaved fashion due to the persistence of the fold lines in the sheet material. A relatively heavy weight paper or card-weight sheet is preferred for its greater fold memory. The resulting folded sheet thus makes an attractive product for maps and information guides which are conveniently self-folding and unfolding, and which are folded to a compact condition that can fit easily in a wallet, pocket, or purse.

The step of folding the templates to form the fold lines in the sheet can be done manually or by machine. Since the templates already delineate precisely the fold lines to be formed, folding the templates manually can be easily performed as the folder need only fold the plates inward in the given sequence. This provides a great saving of labor time and cost and results in sheets folded with a high degree of accuracy and consistency, as compared to conventional manual folding in which each fold must be measured and creased separately. Alternatively, a machine can be constructed to simply push the plate elements inward in the required sequence. Such a machine would be far simpler and less costly to construct and operate, than a conventional folding machine which must handle and fold the entire sheet rather than just the pre-established templates.

Although a preferred embodiment of the invention has been described above, it should be understood that many variations and modifications are possible within the disclosed principles of this invention. For example, the folding templates can be designed and/or modified in various ways or substituted with other materials to accomplish the purposes of the invention. It is intended that the embodiment described herein and all such variations and modifications be included within the scope of the invention, as defined in the following claims.

We claim:

1. An improved sheet folding method comprising:

providing an upper folding template and a lower folding template, each of said templates having a planar surface area and being formed with a plurality of plate elements of respective shapes and subareas fitted in said surface area, wherein said plate elements of said upper folding template correspond in their shapes and subareas to those of said lower folding template, and wherein each plate element is joined along respective joining lines to its adjacent plate elements by thin, flexible joining parts which allow the plate elements to be folded along the joining lines;

placing a sheet of foldable material between said upper and lower folding templates; and folding said upper and lower templates with said sheet therebetween along the joining lines between the plate elements according to a selected order of folding to form the desired fold lines in the sheet corresponding to said joining lines between said plate elements.

2. A folding method according to claim 1, wherein said joining parts are adhesive tape applied over the joining lines of adjacent plate elements.

3. A folding method according to claim 1, wherein said joining parts are strips of high strength synthetic fabric applied with adhesive over the joining lines of adjacent plate elements.

4. A folding method according to claim 1, wherein said plate elements are formed by etching a thin metal sheet using a master template corresponding to the upper and lower templates as a mask, and the resulting plate elements are assembled with said joining parts using an assembly frame provided with holding recesses corresponding to said plate elements.

5. A folding method according to claim 4, wherein said plate elements are made of a magnetic material, and said frame includes a substrate in which said recesses are formed having magnets mounted therein for holding the plate elements onto the frame.

6. A folding method according to claim 1, wherein said folding step is carried out by a machine operated to push the plate elements in the desired order of fold configurations.

7. An improved sheet folding apparatus comprising:

an upper folding template and a lower folding template, each of said templates having a planar surface area and being formed with a plurality of plate elements of respective shapes and subareas fitted in said surface area, wherein said plate elements of said upper folding template correspond in their shapes and subareas to those of said lower folding template, and wherein each plate element is joined along respective joining lines to its adjacent plate elements by thin, flexible joining parts which allow the plate elements to be folded along the joining lines, wherein a sheet of foldable material placed between said upper and lower folding templates is folded by said upper and lower templates with said sheet therebetween being folded along the joining lines between the plate elements according to a selected order of folding to form the desired fold lines in the sheet corresponding to said joining lines between said plate elements.

8. A folding structure according to claim 7, wherein said joining parts are adhesive tape applied over the joining lines of adjacent plate elements.

9. A folding structure according to claim 7, wherein said joining parts are strips of high strength synthetic fabric applied with adhesive over the joining lines of adjacent plate elements.

10. An improved sheet folding method comprising forming:

central inverse cross fold lines (20,22), and a central vertical fold line (23) through the center of a sheet;

a pair of opposing side vertical fold lines (28,44 and 46,52) and upper and lower lateral fold lines (42,48 and 40,50), which define opposing pairs of upper and lower rectangular outer pleats (1,2 and 5,6, and 9,12 and 15,16) of the sheet;

inverse outer cross fold lines (32,34 and 36,38), which define inverse folds in the opposing pairs of outer pleats so that each pair folds inwardly toward the other; and inverse tuck vertical fold lines (72,76), inverse tuck lateral fold lines (70,74), tuck cross fold lines (24,26) formed on outer parts of one of said pair of opposing outer pleats, which define a pair of tuck folds into which the inverse folds of the other pair of outer pleats fold in interleaved fashion.

* * * * *